Sept. 21, 1943. C. R. PALMER 2,330,080
STAKE PLANT MARKER
Filed Dec. 21, 1942

INVENTOR.
Charles R. Palmer
BY

Patented Sept. 21, 1943

2,330,080

UNITED STATES PATENT OFFICE 2,330,080

STAKE PLANT MARKER

Charles R. Palmer, Amberly, Ohio

Application December 21, 1942, Serial No. 469,693

3 Claims. (Cl. 40—19)

This invention relates to improvements in plant markers, which generally may be designated as of a stake type, having a pointed end for depressing it into the earth for sustenance in an erect or perpendicular position adjacent to the plant, for which it bears a means of identification.

An object of the invention is to provide a plant marker of stake type, constituting a single stem formed of transparent material, having one end pointed for readily depressing it into the earth, and its opposite end crooked, and of open end tubular form, to receive and visibly house a plant identifying tag or indicia to present the same laterally of the stem for convenient legibility, and inclined to drain and prevent the collection therein of condensation or other foreign matter.

Another object is to provide a plant marker of stake type for visibly sustaining a plant identifying tag or indicia, as a single unitary or integral structure, economical in manufacture, of non-deteriorating material, from which the tag or indicia bearing the plant identifying or record data can be readily removed or replaced, and frictionally confined therein to avoid accidental displacement, and with the data bearing tag of cellulosic sheet material having one or both sides surfaced to scribe or imprint thereon.

Various other features and advantages of the invention will be more fully apparent from a description of the accompanying drawing, in which.

Figure 1:
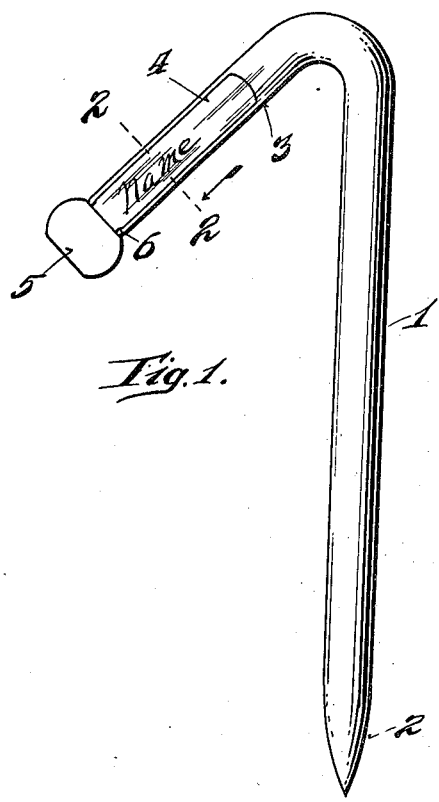
Figure 1 is a side elevation of the improved marker.
Figure 3:
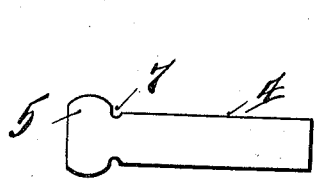
Figure 3 is a plan view of the tag.
Figure 2:
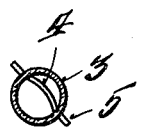
Figure 2 is a section on line 2—2, Figure 1.
Figure 4:
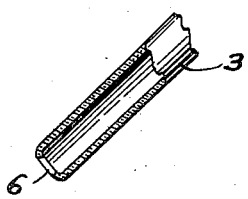
Figure 4 is a longitudinal section through the head of the marker.

Referring to the drawing, 1 indicates a stake of transparent tubular non-deteriorating material, preferably glass, having one end of the tube contracted into a point 2 for easy penetration into the earth with a slight depressing pressure. The opposite or head end of the tube is crooked to extend laterally from the stake or stem and inclined downward providing an open end cylindrical transparent housing 3 for the reception of a marking card or tag 4. In extending the card holding head section 3 laterally of the stake or stem, the marking data is more conveniently readable and possessing a downward inclination any moisture condensation will drain therefrom.

The stake is readily and cheaply formed from a determined length of conventional or commercial glass tubing, producing a unit of a single integral structure, economical in manufacture, and superior to types in which the marking card or tag enclosure is separate from the stake or support.

The marking or data containing card 4 is preferably formed into strip of sheet material, having an enlarged head end 5, providing a finger hold and limiting the depth of card insertion into the open end of the tubular head 3 of the stake. The body portion of the card is of a width slightly in excess of the diameter of the bore of the tubular head, necessitating it to be flexed or bowed transversely to allow for insertion into the bore of the head and to retract to frictionally impinge against the surface of the bore, withholding against accidental dislodgment or displacement.

The marking card or tag is preferably constructed from cellulosic sheet material, thereby possessing sufficient elasticity to retract when bowed for deposit into the tubular head of the stake to bring its opposite longitudinal edges against the surface of the bore of its enclosure under a tension resisting accidental dislodgment.

A card of cellulosic material is long life enduring and not generally affected by the action of elements resulting from outdoor exposure.

The card preferably has one or both sides surfaced for directly conspicuously applying markings with a pencil or otherwise imprinting thereon, and from which the pencil markings can be erased for card re-use particularly when only short season service is contemplated.

As an auxiliary or independent method for locking or binding the card within the tubular head 3 of the stake, the annular edge at the open end of the head 3 is provided with an inwardly flaring flange 6 for socketing the neck 7 of the card, produced by notching the opposite edges of the card body immediately beneath the base edge of the card head 5.

The crooked head end of the stake, aside from providing a deflecting transparent tubular open ended housing for the plant identifying card affords a convenient hand hold for pressing the pointed end of the stake into the earth or removal therefrom.

While it is obvious that the article can be produced from transparent moldable plastic, and with a solid stem, glass is preferable, as commercial glass tubing provides an extremely low material cost and its shaping can be easily and speedily performed with inexpensive equipment.

Having described the invention, I claim:

1. A stake plant marker comprising a determined length of transparent tubing contracted at one end providing a point and having its opposite end deflected to provide an inclined open end cylindrical head for the reception of a marking card and a marking card of the width in excess of the bore diameter of the tubing necessitating a crosswise bowing of the card for insertion into said head, and thereby bind the same therein against accidental dislodgement.

2. A stake plant marker, comprising a determined length of transparent tubing contracted at one end providing a point, and having its opposite end deflected to provide an open ended head for the reception of a marking card, and a marking card constituting a sheet strip for insertion into the said head having an enlarged end providing a finger hold and limiting the depth of card insertion into the head of the stake.

3. A stake plant marker, comprising a determined length of transparent tubing contracted at one end providing a point, and having its opposite end deflected to provide an open ended head for the reception of a marking card, the open end of said head flanged inwardly, and a marking card constituting a sheet strip for insertion into the said head, the strip toward one end having a notch in each of its opposite edges for socketing said flange and locking the card within the head of the stake against accidental dislodgment.

CHARLES R. PALMER.